(12) United States Patent
Stettner et al.

(10) Patent No.: US 9,874,299 B2
(45) Date of Patent: Jan. 23, 2018

(54) PNEUMATIC SEED DISTRIBUTION HOSE COUPLING ASSEMBLY

(75) Inventors: Cameron Wade Stettner, Martensville (CA); Dennis Chahley, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 1046 days.

(21) Appl. No.: 12/774,213

(22) Filed: May 5, 2010

(65) Prior Publication Data

US 2011/0272939 A1 Nov. 10, 2011

(51) Int. Cl.
*F16L 37/00* (2006.01)
*F16L 33/32* (2006.01)
*F16L 33/22* (2006.01)
*F16L 37/092* (2006.01)
*A01C 7/08* (2006.01)

(52) U.S. Cl.
CPC .............. *F16L 33/32* (2013.01); *A01C 7/082* (2013.01); *F16L 33/227* (2013.01); *F16L 37/0925* (2013.01); *F16L 2201/80* (2013.01)

(58) Field of Classification Search
CPC ... F16L 37/0925; F16L 37/091; F16L 37/092; F16L 37/133; F16L 37/0987; F16L 37/088; F16L 37/084; F16L 37/0844; F16L 33/227; F16L 33/32; F16L 33/225
USPC .......................... 285/39, 243, 322, 323, 324
See application file for complete search history.

(56) References Cited

U.S. PATENT DOCUMENTS

| 2,784,987 | A | * | 3/1957  | Corcoran ...................... 285/82  |
| 3,628,812 | A | * | 12/1971 | Larralde et al. ............... 285/24  |
| 3,743,326 | A |   | 7/1973  | Courtot et al. |
| 4,606,783 | A |   | 8/1986  | Guest |
| 4,657,286 | A |   | 4/1987  | Guest |
| 5,171,045 | A | * | 12/1992 | Pasbrig ....................... 285/308 |
| 5,564,757 | A | * | 10/1996 | Seabra ......................... 285/322 |
| 5,865,996 | A | * | 2/1999  | Reid ............................ 210/232 |
| 5,909,902 | A |   | 6/1999  | Seabra |
| 6,065,779 | A |   | 5/2000  | Moner et al. |
| 6,725,788 | B2|   | 4/2004  | McCartney et al. |
| 7,021,224 | B2|   | 4/2006  | Mayerle et al. |

(Continued)

FOREIGN PATENT DOCUMENTS

DE 4002057 2/1991
GB 2007322 5/1979

*Primary Examiner* — Matthieu F Setliff
*Assistant Examiner* — James A Linford
(74) *Attorney, Agent, or Firm* — Rebecca L. Henkel; Rickard K. DeMille

(57) ABSTRACT

In an embodiment, a hose coupling assembly includes a collet including a head and an axial protrusion extending from the head in a first axial direction. The axial protrusion is configured to engage a hose while the axial protrusion is in a locked position, and to disengage the hose while the axial protrusion is in an unlocked position. The hose coupling assembly also includes a housing disposed about the axial protrusion and configured to receive the hose. An inner surface of the housing is shaped to enable movement of the axial protrusion toward the unlocked position in response to movement of the axial protrusion in the first axial direction, and to drive the axial protrusion toward the locked position in response to movement of the axial protrusion in a second axial direction, opposite the first axial direction.

18 Claims, 5 Drawing Sheets

(56) References Cited

U.S. PATENT DOCUMENTS 7,354,079 B2    4/2008  Rehder et al.
7,410,193 B2 *  8/2008  Guest ............................ 285/376

* cited by examiner

PNEUMATIC SEED DISTRIBUTION HOSE COUPLING ASSEMBLY

BACKGROUND

The invention relates generally to a pneumatic seed distribution hose coupling assembly, and more specifically, to a hose coupling assembly configured to facilitate rapid connection and disconnection of a pneumatic seed distribution hose, while providing a substantially smooth transition between the hose and a target object.

A range of agricultural implements have been developed and are presently in use for tilling, planting, harvesting, and so forth. Seeders, for example, are commonly towed behind tractors and may cover wide swaths of ground which may be tilled or untilled. Such devices typically open the soil, dispense seeds in the soil opening, and re-close the soil in a single operation. In seeders, seeds are commonly dispensed from bulk seed tanks and distributed to row units by a distribution system. In certain configurations, air carts are towed behind the seeders to deliver a desired flow of seeds to the row units.

Air carts generally include a seed storage tank, an air source (e.g., a blower) and a metering assembly. The seeds are typically gravity fed from the storage tank to the metering assembly that distributes a desired volume of seeds into an air flow generated by the air source. The air flow then carries the seeds to the row units via hoses extending between the air cart and the seeder. As will be appreciated, an operator may periodically inspect the distribution hoses to ensure that seeds and/or other debris are not blocking the flow. Consequently, certain implements include coupling assemblies configured to facilitate rapid connection and disconnection of the hoses from the seeder and/or air cart. Unfortunately, such coupling assemblies may include protrusions that extend into the flow path of the air and seeds. As a result, seeds may collect on these protrusions over time, eventually resulting in substantial blockage of the flow path between the air cart and the seeder.

BRIEF DESCRIPTION

Embodiments of the present disclosure include a hose coupling assembly configured to facilitate rapid connection and disconnection of a pneumatic seed distribution hose, while providing a substantially smooth transition between the hose and a target object, thereby substantially reducing the possibility of build-up within the assembly. In one embodiment, the hose coupling assembly includes a housing, a gasket, a collet and a seal. The housing includes an inner contoured surface configured to interact with axial protrusions of the collet. The axial protrusions extend in a first axial direction from a head of the collet, and are biased radially outward such that the axial protrusions contact the inner contoured surface of the housing. The inner contoured surface of the housing is shaped such that movement of the axial protrusions in the first axial direction facilitates radially outward movement of each axial protrusion, and movement of the axial protrusions in a second axial direction, opposite the first axial direction, drives each axial protrusion radially inward. Each axial protrusion includes a tooth coupled to a radially inward surface of the axial protrusion. The teeth are configured to selectively engage and disengage the hose based on radial position of the axial protrusions. The gasket, sandwiched between the head of the collet and an axial surface of the housing, is configured to bias the axial protrusions in the second axial direction such that the axial protrusions move radially inward to a position in which the teeth engage the hose. In this configuration, movement of the hose in the second axial direction is blocked by contact with the teeth. Consequently, the hose may remain secured to the hose coupling assembly despite vibration of the assembly. In addition, because no protrusions extend into the product flow path, build-up within the hose coupling assembly will be substantially reduced or eliminated.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
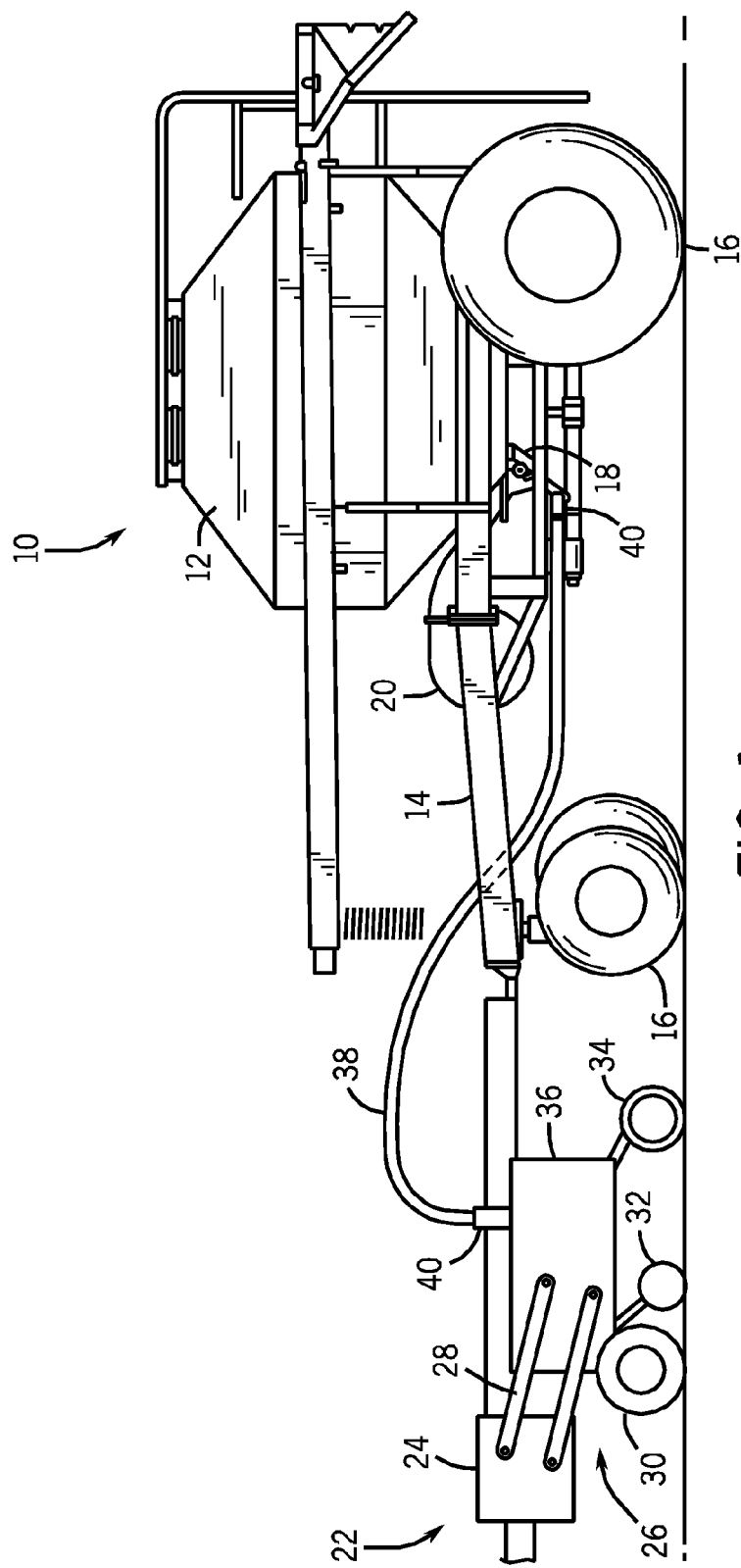
FIG. 1 is a side view of an air cart and a row unit configured to receive product from the air cart via a distribution hose.

Turning now to the drawings, FIG. 1 is a side view of an air cart and a row unit configured to receive product from the air cart via a distribution hose. In the illustrated embodiment, the air cart 10 includes a storage tank 12, a frame 14, wheels 16, a metering assembly 18 and an air source 20. In certain configurations, the storage tank 12 includes multiple compartments for storing various flowable particulate materials. For example, one compartment may include seeds, and another compartment may include a dry fertilizer. In such configurations, the air cart 10 is configured to delivery both the seeds and fertilizer to the implement. The frame 14 includes a towing hitch configured to couple to the implement or tow vehicle. Seeds and/or fertilizer within the storage tank 12 are gravity fed into the metering assembly 18. The metering assembly 18 includes meter rollers that regulate the flow of material from the storage tank 12 into an air flow provided by the air source 20. The air flow then carries the material to the implement, thereby supplying row units with seeds and/or fertilizer for deposition within the soil.

In the present embodiment, the air cart 10 is coupled to the implement 22 via the frame 14. The implement 22, in turn, may be coupled to a work vehicle, such as a tractor, which pulls the implement 22 and the air cart 10 through a field. As illustrated, the implement 22 includes a tool bar 24 configured to support one or more row units 26. In certain configurations, multiple row units 26 may be mounted in parallel along the tool bar 24. Further implement configurations may include multiple tool bars 24, each supporting multiple row units 26. In the present embodiment, the row unit 26 includes elements 28 of a parallel linkage assembly, also known as a four bar linkage, configured to couple the row unit 26 to the tool bar 24, while enabling vertical movement of the row unit 26.

In the illustrated embodiment, the row unit 26 also includes a coulter assembly 30, a soil closing assembly 32, and a packer assembly 34. The coulter assembly 30 may include a gauge wheel positioned a vertical distance above a coulter disk to establish a desired trench depth for seed deposition into the soil. As the row unit 26 travels across a field, the coulter disk excavates a trench into the soil, and seeds are deposited into the trench. As will be appreciated, seeds may be deposited within the excavated trench via a seed tube extending between a hopper 36 and the soil. The seed tube exit may be positioned aft of the coulter assembly 30 and in front of the closing assembly 32 such that seeds flow into the trench. Closing disks of the closing assembly 32 push the excavated soil into the trench, thereby closing the trench. A packer wheel of the packer wheel assembly 34 is positioned aft of the closing assembly 32, and serves to pack soil on top of the deposited seeds. The process of excavating a trench into the soil, depositing seeds within the trench, closing the trench and packing soil on top of the seeds establishes a row of planted seeds within a field.

As previously discussed, product (e.g., seeds and/or fertilizer) is transferred from the air cart 10 to the row unit 26 via a flow of air passing through a pneumatic seed distribution hose 38. For implements 22 with multiple row units 26, separate hoses 38 and/or a distribution system may be employed to transfer product from the air cart 10 to each row unit 26. As illustrated, the hose 38 is coupled to the air cart 10 by a first hose coupling assembly 40, and coupled to the hopper 36 of the row unit 26 by a second hose coupling assembly 40. In this configuration, seeds and/or fertilizer may be transferred from the air cart 10 to the row unit 26 for deposition within the soil. As discussed in detail below, the hose coupling assembly 40 is configured to facilitate rapid connection and disconnection of the pneumatic seed distribution hose 38, while providing a substantially smooth transition between the hose 38 and the target object (e.g., hopper 36, air cart 10, etc.). As a result of the smooth transition, the assembly 40 may substantially reduce the possibility of product build-up, thereby providing a continuous flow of seeds and/or fertilizer to the target object. While the hose coupling assembly 40 is described below with reference to a hose 38 extending between the air cart 10 and the row unit 26, it should be appreciated that the assembly 40 may also be utilized to couple a hose to a bulk fill seed tank mounted to the implement 22 or any other suitable structure configured to store and/or convey product (e.g., seeds and/or fertilizer).

Figure 2:
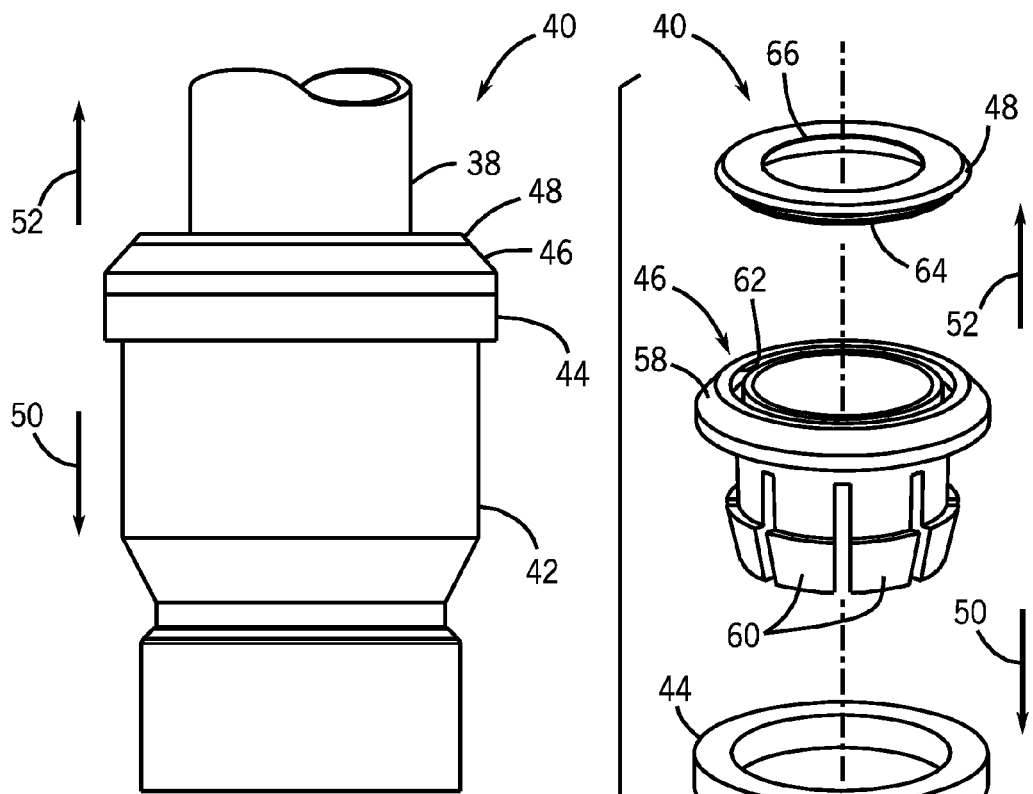
FIG. 2 is a front view of an exemplary pneumatic seed distribution hose coupling assembly which may be employed on the air cart and/or the row unit shown in FIG. 1.

FIG. 2 is a front view of an exemplary pneumatic seed distribution hose coupling assembly 40 which may be employed on the air cart 10 and/or row unit 26 shown in FIG. 1. As illustrated, the hose coupling assembly 40 includes a housing 42, a gasket 44, a collet 46 and a seal 48. As discussed in detail below, the housing 42 includes an inner contoured surface configured to interact with axial protrusions of the collet 46. The axial protrusions extend in a first axial direction 50 from a head of the collet 46, and are biased radially outward such that the axial protrusions contact the inner contoured surface of the housing 42. The inner contoured surface of the housing 42 is shaped such that movement of the axial protrusions in the first axial direction 50 facilitates radially outward movement of each axial protrusion, and movement of the axial protrusions in a second axial direction 52, opposite the first axial direction 50, drives each axial protrusion radially inward. Each axial protrusion includes a tooth coupled to a radially inward surface of the axial protrusion. The teeth are configured to selectively engage and disengage the hose 38 based on radial position of the axial protrusions. The gasket 44, sandwiched between the head of the collet 46 and an axial surface of the housing 42, is configured to bias the axial protrusions in the second axial direction 52 such that the axial protrusions move radially inward to a position in which the teeth engage the hose 38.

In this configuration, movement of the hose 38 in the second axial direction 52 is blocked by contact with the teeth. Consequently, the hose 38 may remain secured to the hose coupling assembly 40 despite vibration of the air cart 10 and/or the implement 22. To uncouple the hose 38 from the hose coupling assembly 40, a force may be applied to the collet 46 in the first axial direction 50, thereby compressing the gasket 44 and driving the axial protrusions in the first axial direction 50. As previously discussed, the axial protrusions are biased radially outward. Therefore, as the axial protrusions engage a portion of the inner surface of the housing 42 that facilitates radially outward movement, the teeth are driven to disengage the hose 38. As a result, the hose 38 will be free to translate in the second axial direction 52 such that an operator may remove the hose 38 from the hose coupling assembly 40. In addition, because the teeth may be configured to enable movement of the hose 38 in the first axial direction 50 even while engaged, the hose 38 may be inserted into the hose coupling assembly 40 without applying a force to the collet 46. As a result of this configuration, an operator may connect and disconnect the hose 38 without the use of tools, thereby reducing the duration of pneumatic system inspection and maintenance operations.

As previously discussed, the gasket 44 is configured to bias the collet 46 in the second axial direction 52. Furthermore, the gasket 44 serves to block fluid flow into and out of the hose coupling assembly 40. Specifically, the gasket 44 may be configured to provide a substantially air-tight seal such that air flow out of the assembly 40 is blocked. In addition, the gasket 44 may block dirt and/or other debris from entering the flow of product (e.g., seeds and/or fertilizer). The seal 48 blocks fluid flow from passing between the outer surface of the hose 38 and the hose coupling assembly 40. As discussed in detail below, the seal 48 may include a lip configured to press against the outer surface to the hose 38 to block fluid flow into and out of the hose coupling assembly 40.

Figure 3:
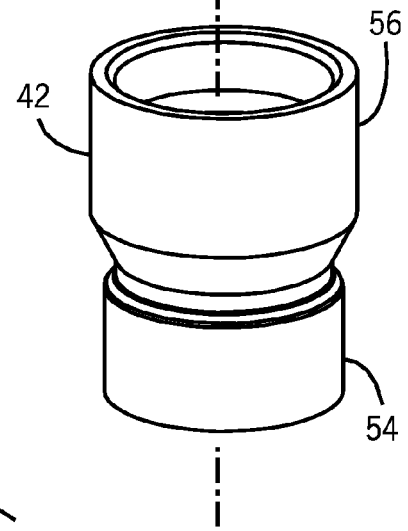
FIG. 3 is an exploded view of the pneumatic seed distribution hose coupling assembly shown in FIG. 2.

FIG. 3 is an exploded view of the pneumatic seed distribution hose coupling assembly 40 shown in FIG. 2. As illustrated, the housing 42 includes a first portion 54 and a second portion 56. The first portion 54 is configured to secure the hose coupling assembly 40 to a target object, such as the air cart 10 or the row unit 26. The second portion 56 is configured to receive the hose 38, and to secure the hose 38 to the hose coupling assembly 40. As previously discussed, the second portion 56 includes an inner contoured surface configured to interact with the axial protrusions of the collet 46. As illustrated, the gasket 44 is positioned between the housing 42 and the collet 46 to provide a seal between the two components, and to bias the collet 46 in the second axial direction 52.

In the present embodiment, the collet 46 includes a head 58 and axial protrusions 60 extending from the head 58 in the first axial direction 50. As illustrated, the head 58 includes a lip configured to sandwich the gasket 44 between the collet 46 and the housing 42. While the illustrated collet 46 includes eight axial protrusions 60, it should be appreciated that alternative embodiments may include more or fewer protrusions 60. For example, certain collets 46 may include 1, 2, 3, 4, 5, 6, 7, 8, 9 or 10 protrusions, or more. As discussed in detail below, each protrusion 60 includes a tooth configured to engage the hose 38 to secure the hose 38 to the hose coupling assembly 40.

As previously discussed, the hose coupling assembly 40 includes a seal 48 configured to block fluid flow into and out of the assembly 40. In the present embodiment, the seal 48 is coupled to the collet 46. Specifically, the collet 46 includes an annular groove 62 configured to receive an annular tongue 64 of the seal 48. In certain embodiments, the tongue 64 may be secured to the groove 62 with an adhesive connection, for example. As discussed in detail below, the seal 48 includes a lip 66 configured to engage the hose 38. For example, an inner diameter of the lip 66 may be smaller than an outer diameter of the hose 38. Consequently, the lip 66 may flex in the first axial direction 50 or the second axial direction 52 as the hose 38 passes through the seal 48. Consequently, the lip 66 will press against the hose 38, thereby blocking air flow out of the hose coupling assembly 40, and blocking dirt and/or other debris from entering the assembly 40.

Figure 4:
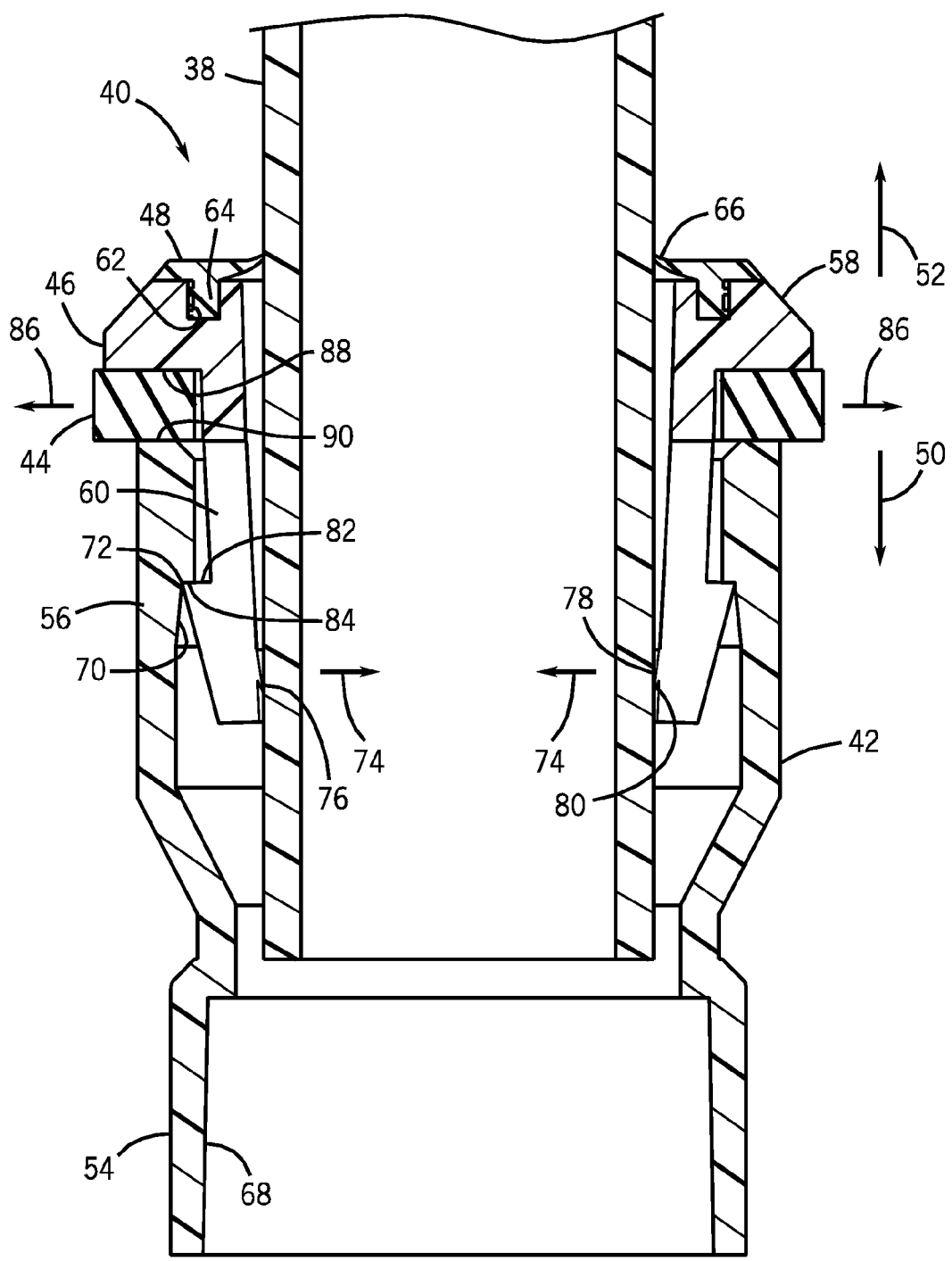
FIG. 4 is a cross-sectional view of the pneumatic seed distribution hose coupling assembly shown in FIG. 2, in which the collet is in a locked position.

FIG. 4 is a cross-sectional view of the pneumatic seed distribution hose coupling assembly 40 shown in FIG. 2, in which the collet 46 is in a locked position. As previously discussed, the first portion 54 of the housing 42 is configured to secure the assembly 40 to a target object, such as the air cart 10 or the row unit 26. In the illustrated embodiment, the first portion 54 of the hose coupling assembly 40 includes an inner mating surface 68. The inner mating surface 68 is configured to interface with a port on the air cart 10 or the hopper 36 of the row unit 26. For example, an inner diameter of the mating surface 68 may be substantially similar to an outer diameter of the port. In such a configuration, the hose coupling assembly 40 may be secured to the target object by an adhesive layer applied between an outer surface of the port and the inner mating surface 68.

As previously discussed, the second portion 56 of the housing 42 includes an inner contoured surface 70 configured to interact with the axial protrusions 60. In the present embodiment, the protrusions 60 are biased radially outward such that an outer surface 72 of each protrusion 60 contacts the inner contoured surface 70. As illustrated, the inner contoured surface 70 is angled in a radially inward direction 74 along the second axial direction 52. Consequently, while the axial protrusions 60 are in the illustrated locked position, a tooth 76 of each axial protrusion 60 is driven to engage the hose 38 via contact between the outer surface 72 of the protrusion 60 and the inner contoured surface 70. As discussed in detail below, the axial protrusions 60 may be driven to the unlocked position by moving the collet 46 in the first axial direction 50. Specifically, because the inner contoured surface 70 is angled radially outward along the first axial direction 50, movement of the collet 46 in the first axial direction 50 enables the protrusions 60 to move radially outward. Because the axial protrusions 60 are biased radially outward in the present embodiment, the teeth 76 are driven radially outward as the protrusions 60 move in the first axial direction 50. Consequently, movement of the collet 46 in the first axial direction 50 induces the teeth 76 to disengage the hose 38, thereby transitioning the axial protrusions 60 to the unlocked position.

As will be appreciated, while the axial protrusions 60 are in the unlocked position with the teeth 76 disengaged from the hose 38, the hose 38 may freely translate in the first axial direction 50 or the second axial direction 52. Therefore, an operator may insert and/or remove the hose 38 from the hose coupling assembly 40 while the axial protrusions 60 are in the unlocked position. In the present embodiment, the teeth 76 are configured to block movement of the hose 38 in the second axial direction 52 while the axial protrusions 60 are in the illustrated locked position. Consequently, the hose 38 may not be removed from the hose coupling assembly 40. However, the teeth 76 are configured to facilitate insertion of the hose 38 into the hose coupling assembly 40 even while the axial protrusions 60 are in the locked position. As illustrated, each tooth 76 includes a first angled surface 78 and a second angled surface 80. The first angled surface 78 is configured to enable movement of the hose 38 in the first axial direction 50 while the teeth 76 engage the hose 38. The second angled surface 80 is configured to block movement of the hose 38 in the second axial direction 52 while the teeth 76 engage the hose 38. Specifically, the combination of the first angled surface 78 and the second angled surface 80 form an angled point that engages the hose 38 with increasing force as the hose 38 is pulled in the second axial direction 52.

With the axial protrusions 60 in the locked position and the teeth 76 engaged with the hose 38, the hose 38 is substantially secured to the collet 46. Furthermore, movement of the collet 46 with respect to the housing 42 in the second axial direction 52 is blocked by contact between a contact surface 82 of each axial protrusion and an inner shoulder 84 of the housing 42. The inner shoulder 84 may extend about the entire circumference of the housing 42 such that each contact surface 82 engages the shoulder regardless of circumferential position. As a result of this configuration, movement of the hose 38 in the second axial direction 52 is blocked with respect to the hose coupling assembly 40. Consequently, the hose 38 may remain connected to the hose coupling assembly 40 despite vibration of the target object (e.g., air cart 10, row unit 26, etc.).

With the collet 46 in the illustrated locked position, the gasket 44 is compressed, thereby inducing the gasket 44 to expand in a radially outward direction 86. As a result of the gasket compression, the collect 46 is biased in the second axial direction 52. Specifically, with the gasket 44 sandwiched between a contact surface 88 of the collet head 58 and an axial surface 90 of the housing 42, compression of the gasket 44 urges the collet 46 in the second axial direction 52 relative to the housing 42. As discussed in detail below, the collet 46 may be driven in the first axial direction 50, thereby further compressing the gasket 44 and driving the axial protrusions 60 toward the unlocked position such that the hose 38 may be removed from the hose coupling assembly 40. In addition to biasing the collet 46 in the second axial direction 52, the gasket 44 serves to block fluid flow into and out of the hose coupling assembly 40. In certain embodiments, the gasket 44 may be a compressible and resilient structure, such as closed-cell foam (e.g., polychloroprene) or a hollow-core o-ring (e.g., rubber o-ring with a hollow cross-section), to provide the biasing force and to block the fluid flow.

As previously discussed, the seal 48 is configured to block air and/or product (e.g., seed, fertilizer, etc.) from passing between the hose 38 and the hose coupling assembly 40. The seal 48 may also block dirt and/or other contaminants from entering the assembly 40. In the illustrated embodiment, the lip 66 presses against the hose 38 and is deflected upwardly, thereby establishing the seal between the hose 38 and the hose coupling assembly 40. Because the lip 66 is flexible, the lip 66 may also be deflected downwardly due to movement of the hose 38 in the first axial direction 50. However, in either position, a substantial seal will be formed between the hose 38 and the hose coupling assembly 40. As illustrated, the tongue 64 of the seal 48 is engaged with the groove 62 of the collet 46, thereby securing the seal 48 to the collet 46. In certain embodiments, an adhesive may be applied between the tongue 64 and groove 62 to couple the seal 48 to the collet 46.

As illustrated, the hose coupling assembly 40 does not include any protrusions that impinge the path of product flow from the hose 38 to the target object. Specifically, product (e.g., seed, fertilizer, etc.) flows directly from the hose 38 to the first portion 54 of the housing 42. As previously discussed, the target object may be coupled to the inner mating surface 68 of the housing 42. Consequently, no protrusion extends into the flow path of product from the hose 38 to the target object which may obstruct the flow of product. While the first portion 54 is configured to mate with a target object in the present embodiment, it should be appreciated that the first portion 54 of alternative embodiments may be configured to interface with a second hose. For example, in certain embodiments, the first portion 54 may be substantially similar to the second portion 56 such that two hoses may be joined together. In such a configuration, the two hoses may be connected to one another without the use of tools, thereby facilitating rapid connection and disconnection of adjoining hoses.

Figure 5:
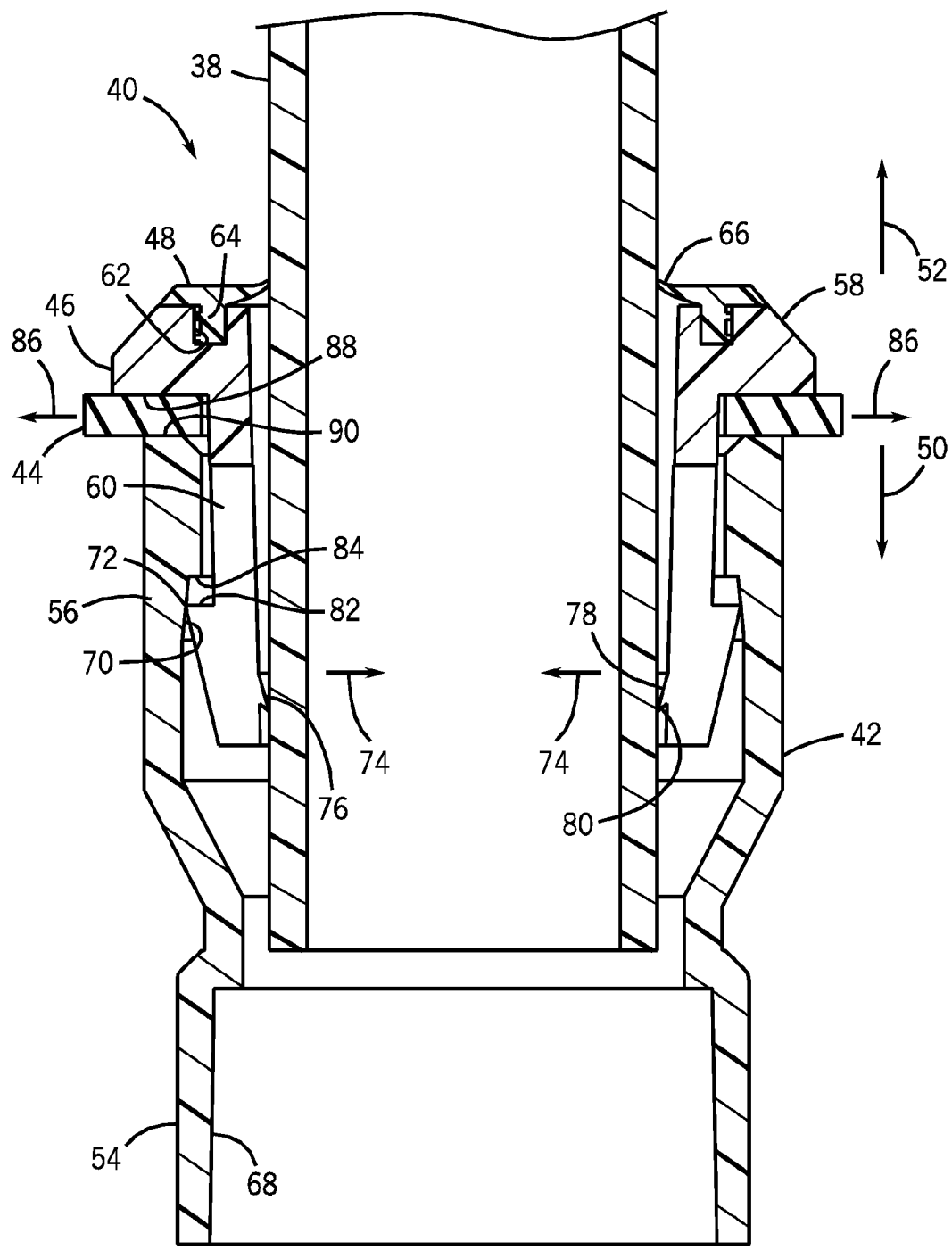
FIG. 5 is a cross-sectional view of the pneumatic seed distribution hose coupling assembly shown in FIG. 2, in which the collet is in an unlocked position.

FIG. 5 is a cross-sectional view of the pneumatic seed distribution hose coupling assembly 40 shown in FIG. 2, in which the collet 46 is in an unlocked position. As previously discussed, the axial protrusions 60 of the collet 46 may be transitioned to the unlocked position in which the teeth 76 disengage the hose 38 by moving the collect 46 in the first axial direction 50. However, because the gasket 44 biases the collet 46 in the second axial direction 52, a force sufficient to overcome the bias may be applied to the collet 46 to move the axial protrusions 60 in the first axial direction 50. For example, an operator may urge the collet 46 in the first axial direction 50 to release the hose 38 from the hose coupling assembly 40.

As the axial protrusions 60 are driven in the first axial direction 50, the teeth 76 disengage the hose 38, thereby facilitating removal of the hose 38 from the hose coupling assembly 40. Specifically, because the axial protrusions 60 are biased radially outward and the inner contoured surface 70 of the housing 42 slopes radially outward along the first axial direction 50, the axial protrusions 60 are driven radially outward as the collet 46 moves in the first axial direction 50. Once the teeth 76 disengage the hose 38, the hose may be translated in the second axial direction 52, thereby withdrawing the hose 38 from the assembly 40. Because the hose 38 may be removed by depressing the collet 46 and pulling the hose 38 along the second axial direction 52, the hose 38 may be disconnected from the target object without the use of tools. As a result, an operator may rapidly disconnect the hose 38 to inspect the pneumatic distribution system, thereby reducing the duration of maintenance operations compared to configurations in which the hose is secured to the target object by a clamp or other tool-actuated connecting device.

Figure 6:
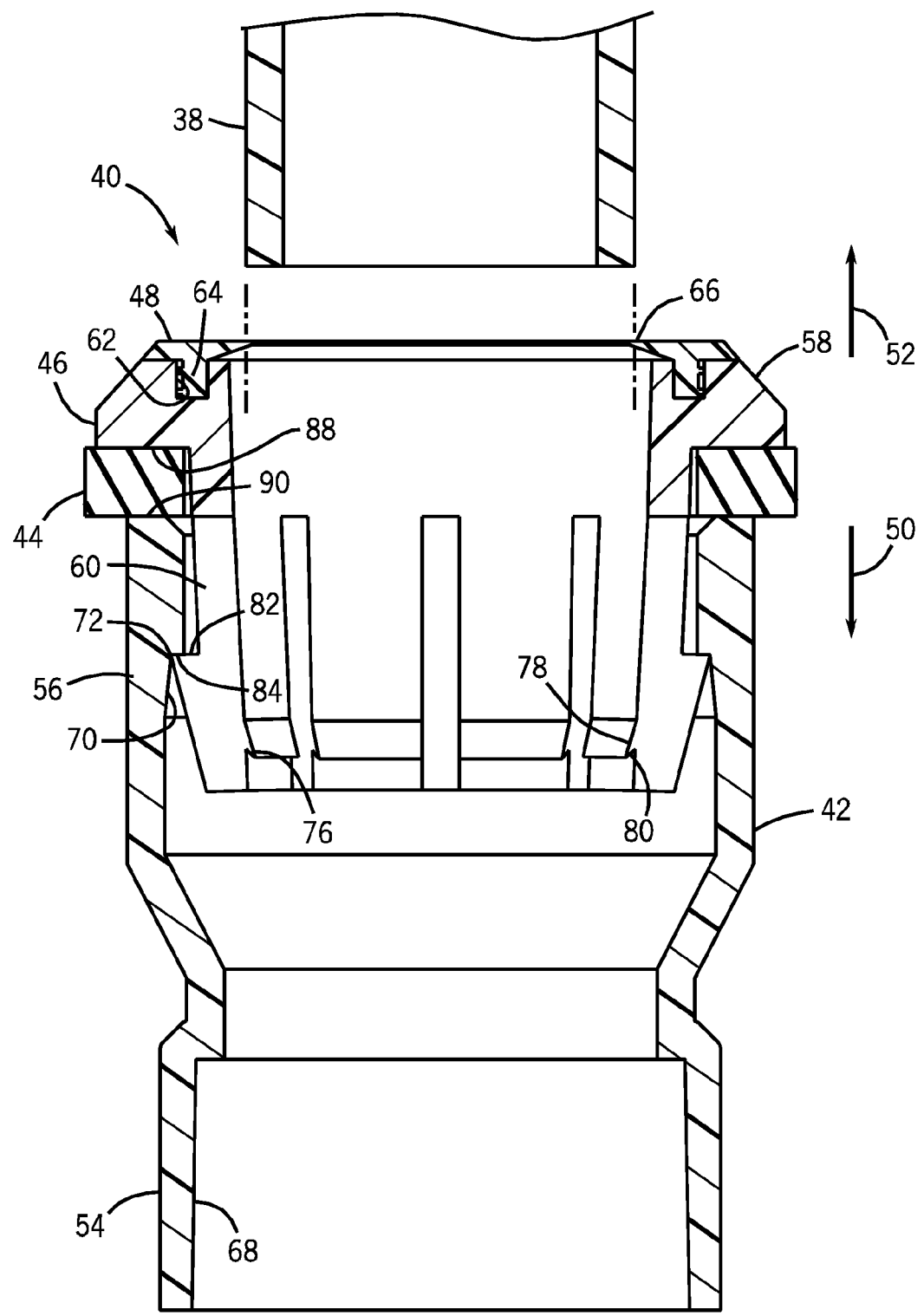
FIG. 6 is a cross-sectional view of the pneumatic seed distribution hose coupling assembly shown in FIG. 2, in which the hose has been removed from the coupling assembly.

FIG. 6 is a cross-sectional view of the pneumatic seed distribution hose coupling assembly 40 shown in FIG. 2, in which the hose 38 has been removed from the coupling assembly 40. As illustrated, the hose 38 has translated in the second axial direction 52, thereby separating the hose 38 from the seed distribution hose coupling assembly 40. With the hose 38 disconnected from the assembly 40, the operator may inspect the hose 38 and/or the coupling assembly 40 for obstructions that may impede the flow of product (e.g., seeds, fertilizer, etc.) from the air cart 10 to the row unit 26. Once the operator has completed inspection and/or maintenance operations, the operator may reconnect the hose 30 by translating the hose 38 into the coupling assembly 40 along the first axial direction 50. As previously discussed, the teeth 76 include a first angled surface 78 configured to enable movement of the hose 38 in the first axial direction 50 while the axial protrusions 60 are in the illustrated locked position. Consequently, the hose 38 may be inserted into the hose coupling assembly 40 without applying a force to the collet 46, thereby facilitating rapid hose connection. As will be appreciated, movement of the hose 38 in the first axial direction 50 may induce the lip 66 of the seal 48 to flex in the first axial direction 50. Contact between the lip 66 and the hose 38 will block air flow out of the hose coupling assembly 40, and block dirt and/or other debris from entering the assembly 40.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A hose coupling assembly, comprising:
 a collet comprising a head and an axial protrusion extending from the head in a first axial direction, wherein the axial protrusion is configured to engage a hose while the axial protrusion is in a locked position, and to disengage the hose while the axial protrusion is in an unlocked position;
 a housing disposed about the axial protrusion and configured to receive the hose, wherein an inner surface of the housing is shaped to enable movement of the axial protrusion toward the unlocked position in response to movement of the axial protrusion in the first axial direction, and to drive the axial protrusion toward the locked position in response to movement of the axial protrusion in a second axial direction, opposite the first axial direction, and wherein the axial protrusion is resiliently biased radially outward from the head such that the axial protrusion maintains contact with the inner surface of the housing without being driven radially outward by contact with another surface; and
 a gasket disposed between the head of the collet and an axial surface of the housing, wherein the gasket is configured to bias the collet in the second axial direction with sufficient force to drive the axial protrusion to the locked position while an external force in the first axial direction is not applied to the collet.

2. The hose coupling assembly of claim 1, wherein the collet comprises a plurality of axial protrusions each extending from the head in the first axial direction, and wherein each axial protrusion comprises a respective tooth for engaging the hose.

3. The hose coupling assembly of claim 1, wherein the locked position corresponds to a radially inward position of the axial protrusion, and the unlocked position corresponds to a radially outward position of the axial protrusion.

4. The hose coupling assembly of claim 1, wherein the gasket comprises closed-cell foam or a hollow-core o-ring.

5. The hose coupling assembly of claim 1, comprising a seal coupled to the head of the collet and configured to contact the hose, wherein the seal is configured to substantially block fluid flow into and out of the hose coupling assembly.

6. The hose coupling assembly of claim 5, wherein the seal comprises a flexible lip configured to engage the hose.

7. The hose coupling assembly of claim 1, wherein the housing comprises an inner mating surface configured to secure the housing to a target object.

8. The hose coupling assembly of claim 1, wherein the axial protrusion comprises a tooth having a first angled surface configured to enable movement of the hose in the first axial direction while the axial protrusion is in the locked position, and a second angled surface configured to block movement of the hose in the second axial direction while the axial protrusion is in the locked position.

9. A hose coupling assembly, comprising:
a housing configured to receive a hose, and comprising an inner contoured surface;
a collet engaged with the housing, and comprising a head and an axial protrusion extending in a first axial direction from the head, wherein the axial protrusion is resiliently biased radially outward from the head such that the axial protrusion maintains contact with the inner contoured surface of the housing without being driven radially outward by contact with another surface, and the inner contoured surface of the housing is shaped such that movement of the axial protrusion in the first axial direction facilitates radially outward movement of the axial protrusion and movement of the axial protrusion in a second axial direction, opposite the first axial direction, drives the axial protrusion radially inward;
a tooth coupled to a radially inward surface of the axial protrusion, wherein the tooth is configured to selectively engage and disengage the hose based on radial position of the axial protrusion, and the tooth is configured to block movement of the hose in the second axial direction while the tooth engages the hose; and
a gasket sandwiched between the head of the collet and an axial surface of the housing, wherein the gasket is configured to bias the axial protrusion in the second axial direction with sufficient force to drive the tooth to engage the hose while an external force in the first axial direction is not applied to the collet.

10. The hose coupling assembly of claim 9, wherein the tooth comprises a first angled surface configured to enable movement of the hose in the first axial direction while the tooth engages the hose, and a second angled surface configured to block movement of the hose in the second axial direction while the tooth engages the hose.

11. The hose coupling assembly of claim 9, wherein the gasket is compressible to facilitate movement of the axial protrusion in the first axial direction.

12. The hose coupling assembly of claim 9, wherein the housing comprises an inner shoulder configured to block movement of the axial protrusion in the second axial direction.

13. The hose coupling assembly of claim 9, comprising a seal coupled to the head of the collet and configured to contact the hose, wherein the seal is configured to substantially block fluid flow into and out of the hose coupling assembly.

14. The hose coupling assembly of claim 9, wherein the collet comprises a plurality of axial protrusions each extending from the head in the first axial direction, and a corresponding plurality of teeth each coupled to the radially inward surface of each axial protrusion.

15. A hose coupling assembly, comprising:
a collet comprising a head and a plurality of axial protrusions each extending from the head in a first axial direction, wherein each axial protrusion comprises a tooth configured to selectively engage and disengage a hose based on a radial position of each axial protrusion relative to the hose, and the teeth are configured to block movement of the hose in the second axial direction while the teeth engage the hose;
a housing disposed about the plurality of axial protrusions and configured to receive the hose, wherein an inner surface of the housing is shaped to enable radially outward movement of each axial protrusion in response to movement of the collet in the first axial direction, and to drive each axial protrusion radially inward in response to movement of the collet in a second axial direction, opposite the first axial direction, and wherein each axial protrusion is resiliently biased radially outward from the head such that the plurality of axial protrusions maintains contact with the inner surface of the housing without being driven radially outward by contact with another surface; and
a gasket sandwiched between the head of the collet and an axial surface of the housing, wherein the gasket is configured to bias the collet in the second axial direction with sufficient force to drive the teeth to engage the hose while an external force in the first axial direction is not applied to the collet.

16. The hose coupling assembly of claim 15, wherein each tooth comprises a first angled surface configured to enable movement of the hose in the first axial direction while the tooth engages the hose, and a second angled surface configured to block movement of the hose in the second axial direction while the tooth engages the hose.

17. The hose coupling assembly of claim 15, comprising a seal coupled to the head of the collet and configured to contact the hose, wherein the seal is configured to substantially block fluid flow into and out of the hose coupling assembly.

18. The hose coupling assembly of claim 15, wherein the gasket is configured to substantially block fluid flow into and out of the hose coupling assembly.

* * * * *